United States Patent [19]

Stansfield et al.

[11] Patent Number: 4,518,435

[45] Date of Patent: * May 21, 1985

[54] DISPERSING AGENT FOR SOLIDS IN POLAR ORGANIC LIQUIDS

[75] Inventors: James F. Stansfield; James Toole; Arthur Topham, all of Manchester, England

[73] Assignee: Imperial Chemical Industries Limited, London, England

[*] Notice: The portion of the term of this patent subsequent to Aug. 16, 2000 has been disclaimed.

[21] Appl. No.: 459,036

[22] Filed: Jan. 18, 1983

Related U.S. Application Data

[63] Continuation-in-part of Ser. No. 276,517, Jun. 23, 1981, Pat. No. 4,398,955, which is a continuation-in-part of Ser. No. 180,810, Aug. 25, 1980, abandoned, which is a continuation-in-part of Ser. No. 877,390, Feb. 13, 1978, abandoned.

[30] Foreign Application Priority Data

Feb. 21, 1977 [GB] United Kingdom ................. 718577

[51] Int. Cl.³ ...................... C09B 47/04; C09D 11/00
[52] U.S. Cl. ................... 106/308 N; 106/23; 106/308 Q; 106/309; 534/654; 534/783; 534/827; 534/880; 260/245.78; 260/501.19
[58] Field of Search ........... 260/245.78, 245.8, 501.19, 260/185, 162, 206; 106/308 N, 308 Q, 23, 309; 241/16, 21

[56] References Cited

U.S. PATENT DOCUMENTS

| 2,490,703 | 12/1949 | Paige | 260/187 |
| 2,490,704 | 12/1949 | Paige | 260/245.8 |
| 3,841,888 | 10/1974 | Belde et al. | 106/308 N |
| 3,917,639 | 11/1975 | Paget et al. | 106/23 |
| 3,928,276 | 12/1975 | Linden et al. | 106/308 N |
| 4,101,690 | 7/1978 | Miyamoto et al. | 106/23 |
| 4,198,203 | 4/1980 | Groll | 260/245.78 |
| 4,239,549 | 12/1980 | Fabian | 260/245.78 |
| 4,282,000 | 8/1981 | Groll | 260/245.78 |
| 4,398,955 | 8/1983 | Stansfield et al. | 106/23 |

FOREIGN PATENT DOCUMENTS

| 2807362 | 8/1978 | Fed. Rep. of Germany |   |
| 1164265 | 9/1969 | United Kingdom | 428/207 |
| 1596281 | 8/1981 | United Kingdom |   |

OTHER PUBLICATIONS

Morrison, R. T. et al., Organic Chemistry, pub. 1966, by Allyn and Bacon, Boston, Mass., p. 1101, (Amino Acids as Dipolar Ions . . . Thyroxine).

Primary Examiner—Helen M. McCarthy
Attorney, Agent, or Firm—Cushman, Darby & Cushman

[57] ABSTRACT

A dispersing agent comprising the salt of a tertiary amine containing at least one poly(lower alkyleneoxy) chain and an aromatic acid having at least two benzene rings and a dispersion of an organic pigment, an organic dyestuff or carbon black in a polar organic solvent containing said dispersing agent is disclosed.

10 Claims, No Drawings

DISPERSING AGENT FOR SOLIDS IN POLAR ORGANIC LIQUIDS

CROSS REFERENCE TO RELATED APPLICATIONS

This application is a continuation-in-part of our earlier application Ser. No. 276,517 filed June 23, 1981, now U.S. Pat. No. 4,398,955, which in turn is a continuation-in-part of our earlier application Ser. No. 180,810 filed Aug. 25, 1980, now abandoned, which in turn is a continuation-in-part of our earlier application Ser. No. 877,390, filed Feb. 13, 1978, now abandoned.

This invention relates to dispersions of solids in polar organic liquids in the presence of a dispersing agent.

According to the present invention we provide a dispersion of a particulate solid in a polar organic medium in the presence of a dispersing agent which is a tertiary amine or a salt thereof with a mineral acid, or an aromatic carboxylic or sulphonic acid, the amine containing at least one polymeric group which is a poly(lower alkylene oxy) chain comprising at least 50% propylene oxy groups or a poly(carbonyl lower alkylene oxy) chain.

By the term lower alkylene in the above definition of the dispersing agent we mean an alkylene group containing from two to eight and preferably from two to four carbon atoms.

Where the dispersing agent contains a poly(lower alkylene oxy) chain or chains it is desirable that at least 65% and preferably from 75% to 100% of the lower alkylene oxy groups are porpylene oxy groups, the remainder preferably being ethylene oxy groups. It is however further preferred that the polymeric group comprises a poly(propylene oxy) chain linked to the nitrogen atom of the tertiary amine by an ethylene oxy group.

Each poly(lower alkylene oxy) chain preferably carries from 3 to 50 lower alkylene oxy groups and more preferably from 7 to 30 of such groups. It is also preferred that there are from 1 to 3 and more preferably one such poly(lower alkylene oxy) chains contained in each molecule of the dispersing agent.

Where the dispersing agent contains a poly(carbonyl lower alkylene oxy) chain or chains it is preferred that the lower alkylene group contains 5 carbon atoms preferably as a chain of 5 methylene groups which lie between the oxygen atom and the carbonyl group, so that the dispersing agent contains one or more poly(E-caprolactone) chains. Each poly(carbonyl lower alkylene oxy) chain preferably contains from 3 to 50 carbonyl lower alkylene oxy groups and more preferably from 7 to 20 such groups. It is also preferred that there are one or two, especially one, poly(carbonyl lower alkylene oxy) chain contained in the dispersing agent.

The term polar organic medium includes organic liquids and resins capable of forming moderate or strong hydrogen bonds as described in the article entitled "A three dimensional approach to solubility" by Crowley et al in Journal of Paint Technology, Vol. 38, 1966, at page 269. Such organic liquids generally have a hydrogen bonding number of 5 or more as defined in the above-mentioned article.

As examples of such polar organic liquids there may be mentioned amines, ethers, especially lower alkyl ethers, organic acids, esters, ketones, glycols, alcohols and amides. Numerous specific examples of such moderately and strongly hydrogen bonding liquids are given in the book entitled "Compatibility and Solubility" by Ibert Mellan (published in 1968 by Noyes Development Corporation) in Table 2.14 on pages 38 and 40 and these liquids all fall within the scope of the term polar organic liquid as used in this specification.

Preferred polar organic liquids are dialkyl ketones, alkyl esters of alkanecarboxylic acids, alkanols and especially those containing up to and including a total of 6 carbon atoms. As examples of the preferred and especially preferred liquids there may be mentioned dialkyl ketones such as acetone, methylethylketone (MEK), diethylketone, diisopropylketone, methylisobutylketone and diisobutylketone; alkyl esters such as methyl acetate, ethyl acetate, isopropyl acetate, ethylformate, methyl propionate and ethyl butyrate and alkanols such as methanol, ethanol, n-propanol, isopropanol, n-butanol and isobutanol.

Preferred resins are film forming resins such as are suitable for use in the preparation of inks, paints and pigment chips for use in inks and paints. As examples of such polar resins there may be mentioned polyesters such as nitrocellulose, cellulose acetate/propionate (cap) and acrylics, polyamides such as Versamid (Trade Mark) and Wolfamide (Trade Mark) and cellulose ethers such as ethylcellulose and ethyl hydroxy ethylcellulose.

It is preferred that the particulate solid is a pigment or a dyestuff. Where the solid is an inorganic pigment it is preferred that the dispersing agent is a free tertiary amine as hereinbefore defined or the salt thereof with a mineral acid or with an aromatic carboxylic or sulphonic acid and that the polar organic liquid is a lower alkanol. Where the solid is an organic pigment or dyestuff it is preferred that the dispersing agent is the salt of a tertiary amine as hereinbefore defined with an aromatic acid containing at least two benzene rings i.e. a polycyclic aromatic acid. The polycyclic aromatic acid preferably contains up to 12 benzene rings, up to 8 of which may be incorporated into fused ring systems such as naphthalenes, anthracenes and phthalocyanines and more preferably is a coloured acid. By a coloured acid is meant an organic dyestuff or pigment, especially from the azo, anthraquinone or phthalocyanine series, containing one or more acid groups, preferably from 1 to 3 sulphonic acid or carboxylic acid groups. It is preferred also that the coloured acid is an acid of the same organic pigment or dyestuff that firms the particulate solid.

As examples of suitable acids there may be mentioned acid dyestuffs such as are used for dyeing wool and nylon textile materials and colourless derivatives of naphthalene sulphonic acids such as the condensates with formaldehyde which can be represented by the general formula:

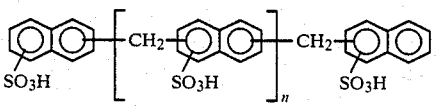

An especially preferred coloured acid is a copper phthalocyanine sulphonic acid especially one containing an average of from 1 to 2 sulphonic acid groups when used in the preparation of a dispersing agent for dispersing green, blue and black pigments and particularly a copper phthalocyanine pigment.

The salts of the amine with a polycyclic aromatic acid are novel and form a preferred feature of the present invention.

As examples of inorganic pigments there may be mentioned titanium dioxide, zinc oxide, cadmium sulphide, iron oxides, vermillion, ultramarine and chrome pigments including chromates of lead, zinc, barium and calcium, the various mixtures and modifications thereof such as are commercially available as greenish-yellow to red pigments under the names primrose, lemon, middle, orange, scarlet and red chromes and especially Prussian Blue.

As examples of organic pigments there may be mentioned pigments of the azo, thioindigo, anthraquinone, anthanthrone, isobenzanthrone or triphendioxazine series, vat dye pigments, phthalocyanine pigments such as copper phthalocyanine and its nuclear halogenated derivatives and copper tetraphenyl and octaphenyl phthalocyanines, quinacridone pigments and lakes of acid, basic and mordant dyestuffs, and especially α and β form copper phthalocyanines and carbon black which for dispersion purposes behaves as an organic pigment.

Such pigments are described in, for example, Volume 2 of the 2nd Edition of the Colour Index which was published in 1956 under the heading "Pigments" and in subsequent authorised amendments thereto.

As examples of dyestuffs there may be mentioned dyestuffs of the azo series, including monoazo and disazo dyestuffs and metallised derivative thereof, anthraquinone, nitro, phthalocyanine, methine, styryl, naphthoperinone, quinphthalone, diarylmethane, triarylmethane, xanthine, azine, oxazine and thiazine series. Such dyestuffs are preferably disperse dyestuffs but may be water-soluble dyestuffs such as basic, acid, or direct dyestuffs, and if desired the dyestuffs can contain reactive groups, that is to say groups capable of forming covalent bonds with textile materials, so that the dyestuffs become chemically attached to the textile materials. Examples of such classes of dyestuffs are given in the appropriate sections of Volumes 1 and 2 of the second edition of Colour Index and the subsequent authorised amendments thereto.

A preferred form of the tertiary amine which may be used as the dispersing agent either directly, or in the form of a substituted ammonium with a mineral acid or an aromatic sulphonic or carboxylic acid, has the general formula:

wherein each of A, B and D independently represents

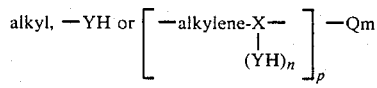

wherein each X independently represents an oxygen or a nitrogen atom provided that, where X is oxygen $m+n=1$ and $p=1$ and where X is nitrogen $m+n=2$ and p is from 1 to 30; each Q independently represents alkyl or -YH; and each Y independently represents a poly(lower alkylene oxy) chain containing from 3 to 50 lower alkylene oxy groups provided that (i) at least one of A, B and D contains a poly(lower alkylene oxy) chain, and (ii) not more than one of the alkylene or alkyl groups contains more than 8 carbon atoms.

In the above formula the alkyl and alkylene groups, which preferably contain not more than 8, and more preferably not more than 6, carbon atoms, may be substituted provided the substituents do not contain active or ionisable hydrogen atoms but it is preferred that they be unsubstituted. As examples of suitable substituents there may be mentioned chlorine, bromine and cyano.

It is however further preferred that each poly(lower alkylene oxy) chain contains not more than one ethylene oxy group and further that this is attached directly to the N atom of the amine, the remaining groups being propylene oxy groups. The preferred value for p is 1 and it is further preferred that X is oxygen.

Preferred amines of the general formula:

are:
alkyl-N—(YH)$_2$,
alkyl N—(alkylene-O-YH)$_2$,
N—(alkylene-O—YH)$_3$,
and especially (alkyl)$_2$—N—alkylene—O—YH,
wherein Y has the meaning hereinbefore defined, and especially wherein the alkylene is ethylene and YH is a poly(propylene oxy) chain.

As specific examples of suitable amines there may be mentioned:
$(CH_3CH_2)_2NCH_2CH_2O(CH_2.CH(CH_3)O)_4H$,
$(CH_3CH_2)_2NCH_2CH_2O(CH_2—CH(CH_3)O)_{12}H$,
$(CH_3)_2NCH_2CH_2O[CH_2-CH(CH_3)O]_{17}H$,
$N[CH_2CH_2O(CH_2-CH(CH_3)O)_{12}H]_3$,

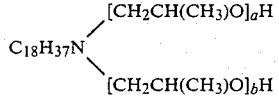

wherein $a+b=15$
$N-[CH_2CH_2O(CH_2CH(CH_3)O)_4H]_3$, and
$(CH_3CH_2)_2N-CH_2CH_2O(CH_2CH_2O)_{10}(CH_2CH(CH_3)O)_{20}H$.

The dispersions of the invention preferably contain from 10% to 80% and more especially from 20% to 40% by weight of the solid based on the total weight of the dispersion depending on the density of the solid. The quantity of dispersing agent contained in these dispersions is preferably from 2% to 50% and more especially from 5% to 30% by weight based on the weight of the solid.

The dispersions of the invention are particularly useful in the preparation of inks based on polar solvents especially printing inks for use in package printing. They are however also of use in stationery inks and paints which are based on polar solvents. Where the solvent is compatible with a plastics material, e.g. a plasticiser, the dispersion may be used to introduce the solid, especially where the solid is a pigment, into the plastics material.

According to a further feature of the invention we provide an ink especially a printing ink, or a paint prepared from a dispersion as hereinbefore defined by addition of the other ingredients conventionally present in such inks or paints, e.g. binders, thickeners, preservatives and further quantities of the organic liquid (as diluent).

The inks which are made from the above mentioned dispersions have enhanced gloss, transparency, brightness and strength compared with such compositions not containing these components or prepared from conventional pigment chips which are expensive and difficult to prepare.

The dispersions of the invention can be obtained by any of the conventional and well known methods of preparing dispersions. Thus the solid, the dispersing agent and the polar organic medium preferably in a liquid form may be mixed in any order and the mixture then subjected to a mechanical treatment to reduce the particle size of the solid, for example by ball milling, bead milling or gravel milling until a dispersion is formed in which the mean diameter of the particles of the solid is desirably less than 10 microns and preferably less than 1 micron.

Where the dispersing agent is soluble in the polar organic medium, the solid can be treated to reduce its particle size independently of the dispersing agent and this added subsequently following which addition the dispersion can be obtained by stirring or otherwise agitating the mixture.

The dispersing agents can be added to a mixture of a pigment or dyestuff and a resin, such as nitrocellulose to prepare pigment compositions such as chips and the similar compositions by for example a hot milling process. Such compositions may subsequently be dissolved in a polar organic solvent to form a liquid pigment dispersion or ink.

Alternatively the dispersing agents can be added to a conventional mill base, that is dispersions of pigments in solvent/resin solutions either before, during or after milling in order to effect improvements in the inks produced therefrom.

According to further features of the invention we provide pigment/resin chips and mill bases as hereinbefore defined, which contain the dispersing agents as hereinbefore defined and also inks prepared from such chips and mill bases.

Where the dispersing agent is the salt of a tertiary amine with an acid it is preferred to prepare the dispersing agent in situ by mixing together the amine, the acid and the polar organic medium following which the amine and the acid react together to form the amine salt which is the dispersing agent. The solid is then added and the dispersion prepared as hereinbefore described.

Whilst the dispersing agent may be soluble to a substantial extent in the polar organic medium it is not essential that it is more than sparingly soluble and in fact there is some advantage with sparingly soluble dispersing agents since these have a lesser tendency to bleed during applications of the dispersions and inks made from them.

The dispersing agents containing a poly(lower alkylene oxy) chain which are used to form the dispersions of the invention may be prepared by reacting the appropriate lower alkylene oxide or mixture of such oxides with an amine containing active hydrogen atoms, e.g. those present in amino and hydroxyl groups, so that each active hydrogen atom is replaced by a poly(lower alkylene oxy) chain, in a known manner.

The dispersing agents containing a poly(carbonyl lower alkylene oxy) chain which are used to form the dispersions of the invention may be prepared by reacting the appropriate lower alkylene lactone with a tertiary amine containing at least one primary or secondary amino group or a hydroxyl group in a known manner so that each of such groups becomes substituted by a poly(carbonyl lower alkylene oxy) chain.

The agents labelled Agent A to J described below are used either as such or after neutralisation with an acid as dispersing agents to form the dispersions described in the Examples which follow and which serve to further illustrate the present invention.

Agent A

8 Parts of potassium are dissolved in 450 parts of 2-diethylaminoethanol and propylene oxide is added at 105° C. under increased pressure until the equivalent by titration with acid reaches 420.

The following are prepared in a similar manner from hydroxyamines and propylene oxide:

| Agent | Hydroxyamine | Equivalent |
|-------|--------------|------------|
| B | 2-diethylaminoethanol | 806 |
| C | triethanolamine | 875 |
| D | " | 2130 |
| E | 2-dimethylaminoethanol | 1095 |

Agent F

A mixture of 71.3 parts of E-caprolactone, 8.1 parts of 3-dimethylaminopropylamine and 0.1 part of tetrabutyl titanate is stirred for 1½ hours at 160°–165° C. under nitrogen. On cooling it forms a hard wax of equivalent 1016.

Agent G

This is prepared similarly but using 150.6 parts of caprolactone. The wax has an equivalent of 2050.

Agent H

This is an adduct prepared from one molecular proportion of 2-diethylaminoethanol and a mixture of 9 molecular proportions of ethylene oxide and 9 molecular proportions of propylene oxide.

Agent I

30 Parts of polyethyleneimine of molecular weight 1200 (sold as PEI-12 by Dow Corp.) is stirred at 40°–50° C. whilst 81.8 parts of propylene oxide is gradually added during 11 hours. After removing unchanged propylene oxide at 100°/18 mm the product weights 74.3 parts. A solution of 1.55 parts of potassium hydroxide in 2.65 parts of water is added and the water removed at 100° C./18 mm. The mixture is stirred at 100°–110° C. whilst 204 parts of propylene oxide is added during 30 hours. After removing unchanged propylene oxide at 100/18 mm the yield is 275 parts of pale amber coloured viscous liquid.

Agent J

This is an adduct prepared by condensing one molecular proportion of 2-diethylaminoethanol firstly with 10 molecular proportions of ethylene oxide and then with 20 molecular proportions of propylene oxide.

EXAMPLE 1

A mixture of 0.53 parts of Agent B, 0.37 part of a copper phthalocyanine sulphonic acid of average degree of sulphonation 1.3 $(CPC(SO_3)_n$ wherein $n=1.3)$ and 6.1 parts of ethanol is ball milled for 2 hours to form the salt, then 3 parts of β-form copper phthalocyanine is added and milling continued for a further 16 hours, to give a fluid dispersion of the pigment which is suitable for use in a printing ink, e.g. for gravure or flexographic printing.

The following table gives further examples of fluid dispersions of the invention which are obtained by milling together in the manner described above (except that when the polycyclic aromatic acid is omitted the initial 2 hours milling without pigment is unnecessary) the pigment and the number of parts thereof listed in column 2 of the table, the agents and the number of parts thereof listed in columns 3 and 4 of the table and sufficient of the organic liquids listed in column 5 of the table to bring the total weight to 10 parts. In the table CPC stands for copper phthalocyanine. Propomeen HT/25 is an adduct from crude octadecylamine and 15 molecular proportions of propylene oxide (Propomeen is a Trade Mark belonging to Armour-Hess).

| Ex. | Pigment and amount thereof | Agent and amount thereof | Polycyclic Aromatic acid and amount thereof | Organic liquid |
|---|---|---|---|---|
| 2 | 3 parts of β-form CPC | 0.38 part of Agent A | 0.52 part of CPC $(SO_3H)_{1.3}$ | ethanol |
| 3 | 3 parts of β-form CPC | 0.51 part of Agent B | 0.31 part of CPC monosulphonic acid | " |
| 4 | 3 parts of β-form CPC | 0.54 part of Agent C | 0.36 part of CPC $(SO_3H)_{1.3}$ | " |
| 5 | 3 parts of β-form CPC | 0.71 part of Agent D | 0.19 part of CPC $(SO_3H)_{1.3}$ | " |
| 6 | 3 parts of β-form CPC | 0.59 part of Agent E | 0.31 part of CPC $(SO_3H)_{1.3}$ | " |
| 7 | 3 parts of β-form CPC | 0.42 part of Agent B | 0.18 part of CPC $(SO_3H)_{1.3}$ | " |
| 8 | 3 part of polychloro CPC | 0.53 part of Agent B | 0.37 part of CPC $(SO_3H)_{1.3}$ | " |
| 9 | 3 parts of carbon black | 0.53 part of Agent B | 0.37 part of CPC $(SO_3H)_{1.3}$ | " |
| 10 | 3 parts of indanthrone | 0.53 part of Agent B | 0.37 part of CPC $(SO_3H)_{1.3}$ | " |
| 11 | 3 parts of α-form partially chlorinated CPC | 0.53 part of Agent B | 0.37 part of CPC $(SO_3H)_{1.3}$ | " |
| 12 | 3 parts β-form CPC | 0.53 part of Agent B | 0.37 part of CPC $(SO_3H_{1.3}$ | isopropanol |
| 13 | 3 parts β-form CPC | 0.6 part of Propomeen HT/25 | 0.3 part of CPC $(SO_3H)_{1.3}$ | " |
| 14 | 3 parts β-form CPC | 0.58 part of Agent F | 0.32 part of CPC $(SO_3H)_{1.3}$ | methylethyl-ketone |
| 15 | 3 parts β-form CPC | 0.7 part of Agent G | 0.2 part of CPC $(SO_3H)_{1.3}$ | methylethyl-ketone |
| 16 | 3 parts β-form CPC | 0.7 part of Agent G | 0.2 part of CPC $(SO_3H(_{1.3}$ | ethyl acetate |
| 17 | 3 parts β-from CPC | 0.53 part of Agent B | 0.37 part of CPC $SO_3H)_{1.3}$ | butanol |
| 18 | 3 parts of Prussian Blue | 0.9 part of Agent A | Nil | ethanol |
| 19 | 3 parts of Prussian Blue | 0.1 part of Agent B | " | " |
| 20 | 3 parts of Prussian Blue | 0.5 part of Propomeen HT/25 | " | " |
| 21 | 7 parts of lead sulpho-chromate | 0.35 part of Agent B | " | " |
| 22 | 5 parts of chromium oxide | 0.5 part of Agent B | " | " |
| 23 | 5 parts of titanium dioxide | 0.5 part of Agent B | " | " |
| 24 | 7 parts of iron oxide | 0.7 part of Agent B | " | " |
| 25 | 5 parts of Prussian Blue | 0.5 part of Propomeen HT/25 | " | isopropanol |
| 26 | 5 parts of Prussian Blue | 0.5 part of the hydrochloride of Agent B | " | ethanol |
| 27 | 5 parts of Prussian Blue | 0.5 part of the sulphate of Agent B | " | " |
| 28 | 5 parts of Prussian Blue | 0.5 part of the acetate of Agent B | " | " |
| 29 | 5 parts of Prussian Blue | 0.5 part of the benzoate of Agent B | " | " |
| 30 | 5 parts of Prussian Blue | 0.5 part of the p-toluene sulphonate | " | " |

-continued

| Ex. | Pigment and amount thereof | Agent and amount thereof | Polycyclic Aromatic acid and amount thereof | Organic liquid |
|---|---|---|---|---|
| | | of Agent B | | |
| 31 | 3 parts of β-form CPC | 0.61 part of Agent H | 0.29 part of CPC (SO$_3$H)$_{1.3}$ | " |
| 32 | 3 parts of β-form CPC | 0.53 part of Agent I | 0.37 part of CPC (SO$_3$H)$_{1.3}$ | " |
| 33 | 3 parts of Carbon Black | 0.7 parts of Agent J | 0.2 part of Acid A | " |
| 34 | 3 parts of Carbon Black | 0.65 part of Agent J | 0.26 part of Acid B | " |
| 35 | 3 parts of Carbon Black | 0.78 part of Agent J | 0.12 part of Acid C | " |
| 36 | 3 parts of Carbon Black | 0.71 part of Agent J | 0.19 part of Acid D | " |
| 37 | 3 parts of polychlorinated CPC | 0.78 part of Agent J | 0.19 part of Acid E | " |

In the above Examples the coded polycyclic aromatic acids have the following identities:

Acid A is

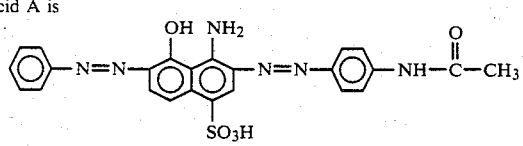

Acid B is

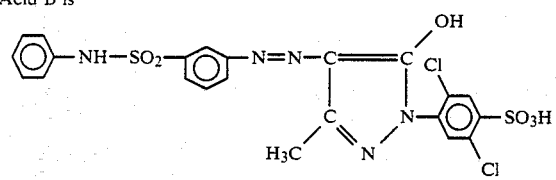

Acid C is

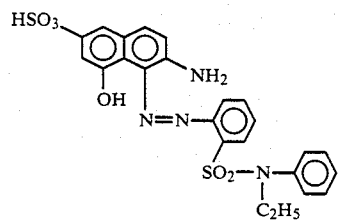

Acid D is

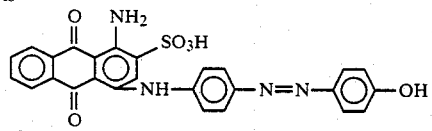

Acid E is a naphthalene sulphonic acid/formaldehyde condensate made by condensing equimolar proportions of naphthalene-2-sulphonic acid and formaldehyde under acid conditions.

EXAMPLE 38

20 parts of β-copper phthalocyanine is mixed with 80 parts of a varnish medium consisting of 15 parts of nitrocellulose, 17 parts of isopropyl acetate, 58 parts of ethanol 74 OP, 4.8 parts of Agent B and 3.2 parts of CPC(SO$_3$H)$_{1.3}$. The mixture is milled for 18 hours in a Ball Mill before dilution with 100 parts of a varnish medium comprising 15 parts nitrocellulose, 17 parts isopropyl acetate and 68 parts of ethanol 74OOP. This mill base is suitable for mixing with further solvent, varnish or other conventional additives for use in printing inks or other surface coating compositions.

We claim:

1. A dispersion of from 10% to 80% by weight, based on the total weight of the dispersion, of a particulate solid selected from organic pigments, organic disperse dyestuffs and carbon black in a polar organic liquid selected from ethers, esters, ketones, glycols, alcohols and amides, said dispersion containing from 2% to 50% by weight, based on the weight of the particulate solid, of a salt of an amine of the formula:

wherein each of A, B and D independently represents alkyl, -YH or

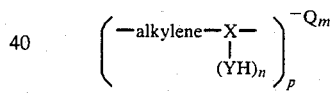

wherein
each X independently represents an oxygen or a nitrogen atom provided that,
where X is oxygen, m+n=1 and p=1, and
where X is nitrogen, m+n=2 and p is from 1 to 30;
each Q independently represents alkyl or —YH; and
each Y independently represents a poly(lower alkylene oxy) chain containing from 3 to 50 lower alkylene oxy groups, provided that
(i) at least one of A, B and D contains a poly(lower alkylene oxy) chain,
(ii) at least 50% of the lower alkylene groups in each poly(lower alkylene oxy) chain are propylene, and
(iii) not more than one of the alkylene or alkyl groups contains more than 8 carbon atoms, with an aromatic acid having at least two benzene rings selected from an organic pigment containing one or more acid groups and an organic dyestuff containing one or more acid groups.

2. A dispersion according to claim 1 in which the aromatic acid contains from 2 to 12 benzene rings.

3. A dispersion according to claim 1 in which the aromatic acid contains from 1 to 3 sulphonic acid or carboxylic acid groups.

4. A dispersion according to claim 3 in which the aromatic acid is a phthalocyanine sulphonic acid.

5. A dispersion according to claim 4 in which the phthalocyanine sulphonic acid contains from 1 to 2 sulphonic acid groups per molecule.

6. A dispersion according to claim 1 in which at least 65% of the lower alkylene groups in each poly(lower alkylene oxy) chain are propylene.

7. A dispersion according to claim 6 in which there are from 7 to 30 monomeric units in each poly(lower alkylene oxy) chain.

8. A dispersion according to claim 1 in which the amine has the formula:

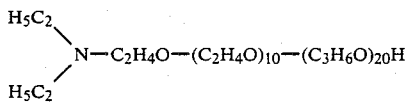

9. A dispersion according to claim 1 in which the liquid is selected from dialkyl ketones, alkyl esters of alkane carboxylic acids and alkanols.

10. A salt of an amine of the formula:

wherein each of A, B and D independently represents alkyl, -YH or

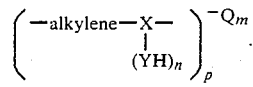

wherein
each X independently represents an oxygen or a nitrogen atom provided that,
where X is oxygen, $m+n=1$ and $p=1$, and
where X is nitrogen, $m+n=2$ and p is from 1 to 30;
each Q independently represents alkyl or —YH; and
each Y independently represents a poly(lower alkylene oxy) chain containing from 3 to 50 lower alkylene oxy groups provided that,
(i) at least one of A, B and D contains a poly(lower alkylene oxy) chain,
(ii) at least 50% of the lower alkylene groups in each poly(lower alkylene oxy) chain are propylene, and
(iii) not more than one of the alkylene or alkyl groups contains more than 8 carbon atoms,
with an aromatic acid having at least two benzene rings selected from an organic pigment containing one or more acid groups and an organic dyestuff containing one or more acid groups.

* * * * *